(12) United States Patent
Tiyapiboonchaiya et al.

(10) Patent No.: US 10,538,644 B2
(45) Date of Patent: Jan. 21, 2020

(54) PLASTICIZER COMPOSITION

(71) Applicants: SCG Chemicals Company Limited, Bangkok Metropolis (TH); Thai Plastic and Chemicals Public Company Limited, Bangkok Metropolis (TH)

(72) Inventors: Churat Tiyapiboonchaiya, Bangkok Metropolis (TH); Chantana Sae-Lim, Bangkok Metropolis (TH)

(73) Assignees: SCG CHEMICALS COMPANY LIMITED, Bangkok Metropolis (TH); THAI PLASTIC AND CHEMICALS PUBLIC COMPANY LIMITED, Bangkok Metropolis (TH)

( * ) Notice: Subject to any disclaimer, the term of this patent is extended or adjusted under 35 U.S.C. 154(b) by 0 days.

(21) Appl. No.: 15/567,993

(22) PCT Filed: Jun. 29, 2016

(86) PCT No.: PCT/TH2016/000059
§ 371 (c)(1),
(2) Date: Oct. 20, 2017

(87) PCT Pub. No.: WO2017/003388
PCT Pub. Date: Jan. 5, 2017

(65) Prior Publication Data
US 2018/0134870 A1    May 17, 2018

(30) Foreign Application Priority Data
Jun. 30, 2015  (EP) .................................. 15001943

(51) Int. Cl.
    *C08K 5/12*      (2006.01)
    *C08K 5/101*     (2006.01)
    *C08K 13/02*     (2006.01)
(52) U.S. Cl.
    CPC ............. *C08K 5/12* (2013.01); *C08K 5/101* (2013.01); *C08K 13/02* (2013.01)
(58) Field of Classification Search
    CPC ........... C08K 5/12; C08K 5/101; C08K 13/02

USPC ............................................. 524/297
See application file for complete search history.

(56) References Cited

U.S. PATENT DOCUMENTS

| 2,628,207 A * | 2/1953 | Smith, Jr. ........... C08K 5/12 |
| | | 524/296 |
| 2013/0317152 A1* | 11/2013 | Becker ............... C08L 33/10 |
| | | 524/296 |

FOREIGN PATENT DOCUMENTS

| EP | 2810932 | * 12/2014 | |
| WO | 2011110350 A1 | † 9/2011 | |
| WO | WO 2011/110350 A1 | 9/2011 | |
| WO | WO-2011110350 A1 | * 9/2011 | ............... C08K 5/10 |

OTHER PUBLICATIONS

International Search Report and Written Opinion dated Sep. 30, 2016 in PCT/TH2016/000059.

* cited by examiner
† cited by third party

*Primary Examiner* — Hui H Chin
(74) *Attorney, Agent, or Firm* — Fay Sharpe LLP

(57) ABSTRACT

The invention relates to a plasticizer composition comprising a terephthalic acid di-ester and an ester having the following formula (I): wherein $R_1$ and $R_2$ are the same or different and represent a straight chain, branched or cyclic hydrocarbyl group. $R_1$ and $R_2$ in formula (I) have from 1 to 15 carbon atoms. The invention further relates to a polymer composition comprising a plasticizer composition comprising a terephthalic acid di-ester and an ester having the following formula (I).

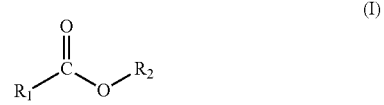

(I)

19 Claims, No Drawings

PLASTICIZER COMPOSITION

This application is a 371 of PCT Patent Application Serial No. PCT/TH2016/000059, filed Jun. 29, 2016, which claims priority to European Patent Application Serial No. 15001943.8, filed Jun. 30, 2015.

FIELD OF THE INVENTION

The present invention relates to a plasticizer composition comprising a terephthalic acid di-ester and a mono-ester that are suitable for plasticizing polymers such as vinyl polymer, halogen-containing polymer, chlorosulfonated polyethylene, cellulose ester, acrylic polymer, polyacetal or the mixture thereof.

BACKGROUND OF THE INVENTION

Plasticizers are compounds or mixtures of compounds that are incorporated into a polymer resin to increase the softness, flexibility, workability, or distensibility of the polymer resin. Common plasticizer includes phthalates, in particular, ortho-phthalates. In recent years, di-2-ethylhexyl phthalate (DEHP or DOP) and shorter alkyl chain length phthalate esters have been restricted in certain applications or are the subject of increased scrutiny due to their toxicological properties and the world wide environmental regularity. Thus, it must be at least considered that alternative plasticizers will be required. For these and most other uses of plasticized polymer systems, high molecular weight phthalates like diisodecyl phthalate (DIDP) and also the plasticizer free of ortho-phthalte such as terephthalic esters like dioctyl terephthalate (DOTP), cyclohexane acid ester like diisononyl 1,2-cyclohexanedicarboxylate (DINCH) have been developed.

U.S. Pat. No. 2,628,207 discloses a composition comprising 100 parts of a resinous copolymer of about 95% vinyl chloride and about 5% vinyl acetate, and 5-100 parts of a DOTP.

US2010/0305250 discloses C7-C12 secondary alcohol esters of cyclohexanecarboxylic acids as plasticizers for polyvinyl chloride (PVC) and other plasticizable polymers.

WO2008/140177 discloses a plasticizer composition comprising at least three different terephthalic acid compounds.

US2013/0310472A1 discloses a foamable composition containing a polymer selected from the group consisting of polyvinyl chloride, polyvinylidene chloride, polyvinyl butyrate, polyalkyl(meth)acrylate and copolymers thereof, a foam former and/or foam stabilizer and di-2-ethylhexyl terephthalate as plasticizer.

US2003/0014948A1 describes the plasticized polyvinyl chloride (PVC) wherein plasticizers comprising dioctyl terephthalate and dioctyl adipate.

US2014/0162045A1 describes a polyvinyl chloride (PVC) article, comprising a PVC resin, a primary plasticizer and a metal-carboxylate acid scavenger. The PVC article further comprises a secondary plasticizer. The primary and secondary plasticizer are selected from the group consisting of phthalates, terephthalate, epoxidized vegetable oils, trimellitates, polyesters, phosphates, citrates, benzoates, sulphonates, and adipates.

Despite all the above-mentioned work, an efficient plasticizer, which can enhance processability, plasticizer absorption speed, weight stability at high temperature, electrical volume resistivity and also reduce defect point of the plasticized polymer at comparable strength, migration and heat stability properties, is still being sought.

It has surprisingly been found that this object can be achieved by a plasticizer composition comprising a terephthalic acid di-ester and an ester having the following formula (I):

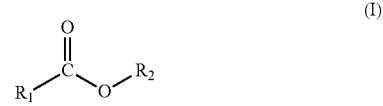

wherein $R_1$ and $R_2$ are the same or different and represent a straight chain, branched or cyclic hydrocarbyl group.

SUMMARY

A first embodiment of the present invention relates to a plasticizer composition comprising a terephthalic acid di-ester and an ester having the following formula (I):

wherein $R_1$ and $R_2$ are the same or different and represent a straight chain, branched or cyclic hydrocarbyl group.

Another embodiment of the present invention relates to a polymer composition comprising at least one polymer selected from the group consisting of vinyl polymer, halogen-containing polymer, chlorosulfonated polyethylene, cellulose ester, acrylic polymer, polyacetal or the mixture thereof, and a plasticizer composition comprising a terephthalic acid di-ester and an ester having the following formula (I)

wherein $R_1$ and $R_2$ are the same or different and represent a straight chain, branched or cyclic hydrocarbyl group.

DETAILED DESCRIPTION

A plasticizer composition comprising a terephthalic acid di-ester and an ester having the following formula (I):

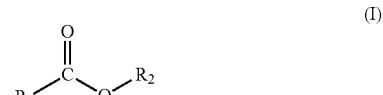

wherein $R_1$ and $R_2$ are the same or different and represent a straight chain, branched or cyclic hydrocarbyl group, preferably alkyl group. $R_1$ and $R_2$ may have from 1 to 15 carbon atoms. Preferably, $R_1$ is an alkyl group having from 1 to 12 carbon atoms, more preferably from 2 to 8 carbon atoms, and most preferably from 2 to 7 carbon atoms. $R_2$ is preferably an alkyl group having from 7 to 15 carbon atoms, more preferably from 7 to 14 carbon atoms, most preferably from 7 to 9 carbon atoms. In yet another preferred embodiment, $R_2$ is an alkyl group having from 7 to 8 carbon atoms.

Most preferably, the ester of formula (I) has 11 to 23 carbon atoms. If the ester of formula (I) has less than 11 carbon atoms, it will be more volatile at room temperature. On the contrary, if the ester of formula (I) has a number of carbon atoms greater than 23, it will be in solid form at room temperature resulting in poorer processability of and compatibility with the polymer resin.

The terephthalic acid di-ester has preferably the following formula (II):

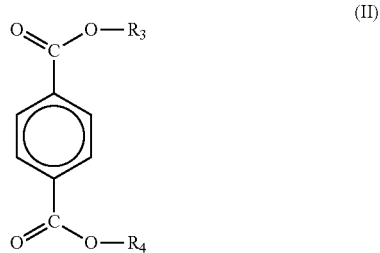

(II)

wherein $R_3$ and $R_4$ are the same or different and represent a straight chain or branched alkyl group having from 6 to 15 carbon atoms, preferably from 8 to 10 carbon atoms. If an alkyl group having a low number of carbon atoms is used, migration will be increased. On the contrary, if an alkyl group having a larger number of carbon atoms is used, compatibility with the polymer resin will decrease due to its high viscosity. The processability of plasticized polymer composite will also be poorer.

Mixtures of the terephthalic acid di-ester and an ester of formula (I) can comprise any ratio of the terephthalic acid di-ester and an ester of formula (I). A suitable mixture could include the terephthalic acid di-ester in an amount of from 80% to 99.7% by weight, preferably 85% to 99.5% by weight, more preferably in an amount of from 92% to 98.5%, and most preferably in an amount of from 92% to 97% by weight with respect to the total amount of the plasticizer composition. Likewise, a suitable mixture could include the ester of formula (I) in an amount of from 0.3% to 20% by weight, preferably 0.5% to 15% by weight, more preferably in an amount of from 1.5% to 8%, and most preferably in an amount of from 3% to 8% by weight with respect to the total amount of the plasticizer composition. In an embodiment, the plasticizer composition consists of a mixture of the terephthalic acid di-ester and an ester of formula (I) in any of the above described embodiments.

The potential use of the plasticizer composition of the present invention is the use as plasticizer for various polymer resins such as vinyl polymer, halogen-containing polymer, chlorosulfonated polyethylene, cellulose ester, acrylic polymer, polyacetal or the mixture thereof, preferably acrylate elastomer, polyvinyl butyral, polyvinyl chloride, epichlorohydrin, chlorosulfonated polyethylene, cellulose-acetate butyrate, most preferably polyvinyl chloride.

The plasticizer composition of the present invention has excellent compatibility with the polymer, especially polyvinyl chloride. This is due to a low viscosity of the said plasticizer composition where the ester of formula (I) acts as a viscosity reducer and an absorption speed improver for the terephthalic acid di-ester.

Another embodiment of the present invention relates to a polymer composition comprising at least one polymer and a plasticizer composition comprising a terephthalic acid di-ester and an ester of formula (I).

The polymer of this embodiment is selected from the group consisting of vinyl polymer, halogen-containing polymer, chlorosulfonated polyethylene, cellulose ester, acrylic polymer, polyacetal or mixtures thereof, preferably acrylate elastomer, polyvinyl butyral, polyvinyl chloride, epichlorohydrin, chlorosulfonated polyethylene, cellulose-acetate butyrate, most preferably polyvinyl chloride.

In the polymer composition of this embodiment, the plasticizer composition comprising terephthalic acid di-ester and an ester of formula (I) may be used in any of the embodiments as described herein before.

The polymer composition of this invention preferably comprises 10 to 100 parts by weight of the plasticizer composition per 100 parts by weight of polymer, more preferably comprises 40 to 60 parts by weight per 100 parts by weight of the polymer. The polymer composition of this invention is easily processed, mixed or formed due to the fact that said plasticizer composition has a low viscosity and a good compatibility with the polymer and, thus, helps to reduce the polymer viscosity while processing, mixing or forming the said polymer composition. Then, the mixing time and cooling time can also be reduced, in which a homogeneous distribution still is obtained, resulting in improved energy saving and higher productivity. Moreover, this polymer composition has a lower decomposition weight, defect point, and higher electrical volume resistivity.

The polymer composition of this present invention further comprises at least one additive selected from the group consisting of fillers, extenders, pigments, thermal stabilizers, UV stabilizers, viscosity regulators, rheological additives, foam formers, foam stabilizers, antistatic agent, impact modifiers and lubricants.

The polymer composition of the invention can be used for the production of compounds, electric wire/cable compounds, wiring harness, sheets, tapes, films, food packages, hoses, auto parts, seal liners, gasket, medical supplies, construction materials, household items, shoes, floor materials, synthetic leathers, tarpaulins, wallpapers, toys, etc.

In the following, the invention is further illustrated by way of examples.

Methods and Definitions

1. Determination of Plasticizer Composition Viscosity
    The viscosity of the plasticizer composition is determined according to ASTM D2196 (Brookfield viscometer), testing at 25° C. and using spindle no. 0.
2. Determination of Plasticizer Absorption Time
    Plasticizer absorption time is determined by the procedure of ASTM D2396-88. The time taken from the addition of the plasticizer until the kneading torque of the planetary mixer reached a minimum is measured as plasticizer absorption time.
3. Determination of Physical Properties of the Polymer Composites
    a) Hardness
        The specimen with thickness of 3 mm is measured according to ASTM D2240 with a hardness tester or durometer (Type A) at five different positions on the specimen and the average value was reported.
    b) Migration is a measure of the plasticizer migration content.

The specimen with thickness of 1 mm is heated in an oven at 70° C. for 10 days and % migration was calculated by the following formula:

$$\% \text{ Migration} = \frac{\text{Weight before oven} - \text{Weight after oven}}{\text{Weight before oven}} \times 100$$

c) Volume resistivity (VR) is a measure of the electrical volume resistance of the polymer compositions.
  Volume resistivity is determined according to ASTM D257. The specimen with thickness of 2 mm is placed between two electrodes. For sixty seconds, a voltage is applied and the resistance is measured. Surface or volume resistivity is calculated, and apparent value is given (60 seconds electrification time).
d) Heat stability is a measure of the endurance of the polymer composite to the heat.
  Heat stability is determined by Metastat machine at 200° C. and 200 minutes. The specimen thickness of 1 mm is visually inspected for discoloration and other signs of degradation. The time of the specimen start to change the color (initial discoloration) and the time of the specimen start to burn (burnt discoloration) are recorded.
e) Weight stability (% Weight loss) is a measure of the decomposition of polymer compositions after heating.
  The specimen with thickness of 1 mm is punched into dumbbell shape and then heated at 100° C. for 168 hours and the % weight loss was calculated as below.

$$\text{Weight loss (\%)} = \frac{\left(\begin{array}{c}\text{Weight of specimen before aging} - \\ \text{Weight of specimen after aging}\end{array}\right) \times 100}{\text{Weight of specimen before aging}}$$

f) The yellowness index is a measure of yellow discoloration of a specimen.
  The specimen with thickness of 1 mm is measured by the Data color machine 600™ according to ASTM D9125.
g) Tensile strength and % Elongation
  Tensile strength and Elongation is measured by JIS K6723. The specimen in dumbbell shape is extended at the cross head speed of 200 mm/min by using the test machine U.T.M. The breaking point is measured. Tensile strength and Elongation are calculated by the following formula.

$$\text{Tensile strength}\left(\frac{\text{kgf}}{\text{mm}^2}\right) = \frac{\text{Load value (kgf)}}{\text{Width (mm)} \times \text{Thickness (mm)}}$$

$$\% \text{ Elongation} = \frac{\text{Extension}}{\text{Primary length}} \times 100$$

h) Brittleness temperature is a measure of the temperature where the polymer composition endures low temperatures before the brittleness is found. The lower the brittleness temperature, the higher the endurance of the polymer composite regards low temperatures.
  The specimen with thickness of 2 mm is measured using the Clash and Berg test (ASTM D746 brittleness test) during the temperature range from −30 to −50° C. by temperature rate 2° C./min.
i) Fish eyes are a surface defect that results from unmelted material appearing on the surface of a molded part.
  Fish eye is measured according to ASTM D3596-09. PVC resin, plasticizer, heat stabilizer and carbon black is hand mixed separately and the compound is milled at 145° C. for 5 minutes, folding edges only once at one minute intervals. The milled sheet with thickness of 1 mm is removed, allowed to cool and placed on a black lighted surface. Gel or hard particle per unit area is counted under magnification.

The abbreviations used in the below tables have the following meanings:
PVC: polyvinyl chloride resin
DOTP: di(2-ethylhexyl) terephthalate
DIDP: di-isodecyl phthalate
DINCH: di-isononyl 1,2-cyclohexanedicarboxylate
2EHP: 2-ethylhexyl propionate
2EHNN: 2-ethylhexyl isononanoate
DOA: di(2ethylhexyl) adipate
ATBC: acetyl tri-butyl citrate
EPO: epoxidize soyabean oil Hereinafter, the present invention is described in more detail through the following examples and comparative examples. However, the following examples are only for the understanding of the present invention, and the present invention is not limited to the following examples.

First Embodiment

Plasticizer compositions of this invention and the comparative plasticizers were prepared by stirring the mixtures at 40 rpm and ambient temperature for 5 minutes. Then, the properties were evaluated as presented in Table 1.

TABLE 1

| | Example (% weight of total plasticizer composition weight) | | | | | | | | | | |
|---|---|---|---|---|---|---|---|---|---|---|---|
| | IE1 | IE2 | IE3 | IE4 | IE5 | IE6 | CE1 | CE2 | CE3 | CE4 | CE5 |
| DOTP | 98.1 | 96.2 | 94.4 | 92.7 | 89.5 | 96.2 | 100.0 | — | — | 96.2 | 96.2 |
| 2EHP | 1.9 | 3.8 | 5.6 | 7.3 | 10.5 | — | — | — | — | — | — |
| 2EHNN | — | — | — | — | — | 3.8 | — | — | — | — | — |
| DIDP | — | — | — | — | — | — | — | 100.0 | — | — | — |
| DINCH | — | — | — | — | — | — | — | — | 100.0 | — | — |
| DOA | — | — | — | — | — | — | — | — | — | 3.8 | — |
| ATBC | — | — | — | — | — | — | — | — | — | — | 3.8 |

TABLE 1-continued

| | \multicolumn{11}{c}{Example (% weight of total plasticizer composition weight)} | | | | | | | | | | |
|---|---|---|---|---|---|---|---|---|---|---|---|
| | IE1 | IE2 | IE3 | IE4 | IE5 | IE6 | CE1 | CE2 | CE3 | CE4 | CE5 |
| Viscosity (cP) | 59 | 44 | 42 | 40 | 40 | 50 | 62 | 93 | 55 | 55 | 54 |
| Plasticizer absorption time second) | 260 | 235 | 233 | 218 | 209 | 286 | 290 | 302 | 371 | 264 | 309 |

As apparent from Table 1, the presence of ester of formula (I) with DOTP (IE1-6) results in lower viscosity than DOTP solely (CE1), higher molecular weight phthalate plasticizer DIDP (CE2) and DINCH (CE3). The higher the amounts of ester of formula (I), the lower viscosities of the plasticizer compositions are found. At the same amount of second plasticizer, the plasticizer composition comprising DOTP and an ester of formula (I) (IE2 and IE6) has lower viscosity than the plasticizer composition comprising DOTP and DOA (CE4) and the plasticizer composition comprising DOTP and ATBC (CE5). These will lead to easier processing of plasticized polymer based on the plasticizer composition of this invention compared to the comparative plasticizers, in addition the lower molecular weight of the ester of formula (I) promotes this effect.

Table 1 also shows that the plasticizer absorption time of plasticizer composition comprising DOTP and ester of formula (I) (IE1-6), especially as regards the lower molecular weight ester of formula (I), are significantly shorter than plasticizer absorption time of DOTP (CE1), higher molecular weight phthalate plasticizer DIDP (CE2) and DINCH (CE3). The plasticizer compositions comprising DOTP and 2EHP (IE1-IE5) also show shorter plasticizer absorption time than the plasticizer composition comprising DOTP and DOA (CE4) and than the plasticizer composition comprising DOTP and ATBC (CE5).

Lower viscosity and shorter plasticizer absorption time using plasticizers composition comprising DOTP and the ester of formula (I), especially the lower molecular weight ester of formula (I), lead to faster processing time.

Second Embodiment

Polymer compositions for cable compounds were prepared according to the materials and amounts as shown in Table 2. The components were dry blended and then mixed by a mixing roll at 160° C. for 4 minutes to prepare a polyvinyl chloride composition sheet for testing heat stability. For testing the properties of hardness, tensile strength, elongation, plasticizer migration content, electrical volume resistance and weight stability, the composition sheets were compressed by compression molding at 180° C. for 5 minutes to a predetermined size. The results were shown in Table 2.

TABLE 2

| | \multicolumn{9}{c}{Polymer composition no.} | | | | | | | | |
|---|---|---|---|---|---|---|---|---|---|
| | 1 | 2 | 3 | 4 | 5 | 6 | 7 | 8 | 9 |
| Ingredients (phr) | | | | | | | | | |
| PVC | 100 | 100 | 100 | 100 | 100 | 100 | 100 | 100 | 100 |
| Calcium carbonate | 30 | 30 | 30 | 30 | 30 | 30 | 30 | 30 | 30 |
| Calcium zinc stabilizer | 4 | 4 | 4 | 4 | 4 | 4 | 4 | 4 | 4 |
| IE1 | 52 | | | | | | | | |
| IE2 | | 53 | | | | | — | — | — |
| IE3 | | | 54 | | | | | | |
| IE4 | | | | 55 | | | | | |
| IE5 | | | | | 57 | | | | |
| CE1 | | — | | | | | 54 | — | — |
| CE3 | | — | | | | | — | 54 | — |
| CE4 | | — | | | | | — | — | 53 |
| CE5 | | | | | | | | | 53 |
| Properties | | | | | | | | | |
| Hardness[1] | 86 | 85 | 85 | 85 | 85 | 85 | 85 | 84 | 84 |
| Tensile strength (kgf/cm$^2$)** | 220 | 227 | 225 | 227 | 222 | 225 | 175 | 228 | 231 |
| Elongation (%)** | 312 | 308 | 310 | 315 | 304 | 316 | 317 | 328 | 343 |
| Migration (%)* | 8.0 | 7.6 | 8.2 | 8.2 | 8.1 | 9.4 | 13.5 | 9.1 | 7.4 |
| Volume resistivity** (×10$^{13}$ ohm · cm) | 4 | 4 | 4 | 4 | 3 | 3 | 1 | 2 | 3 |
| Heat stability** | | | | | | | | | |
| Initial color (min) | 45 | 48 | 45 | 45 | 45 | 45 | 36 | 46 | 50 |
| Burnt color (min) | 140 | 140 | 140 | 140 | 140 | 140 | 120 | 150 | 150 |
| Weight loss (%)* | 1.2 | 1.6 | 2.0 | 2.0 | 2.0 | 2.8 | 3.1 | 2.9 | 3.8 |

[1]The hardness is the control parameter at value 85 ± 2.
*The lower value, the more favorable the resulting composition
**The higher value, the more favorable the resulting composition Table 2 shows that the volume resistance and weight stability properties of the polymer compositions containing DOTP and 2EHP (polymer compositions 1 to 5) are better than the polymer compositions containing the comparative DOTP based plasticizer compositions (polymer compositions 6, 8 and 9) whereas properties such as plasticizer migration, tensile strength, % elongation, stay at comparable levels. Moreover, the polymer composition containing DINCH (polymer composition 7) shows most properties worse than the polymer compositions containing DOTP and 2EHP.

Third Embodiment

Polymer compositions for soft sheet and hose compound were prepared using the materials and amounts as shown in Table 3. The components were dry blended and then mixed by a mixing roll at 160° C., for 4 minutes to prepare a polyvinyl chloride composition sheet for testing heat stability. For testing the properties of hardness, yellowness index, tensile strength, % elongation, plasticizer migration content, and brittleness, the composition sheets were compressed by compression molding at 180° C. for 5 minutes to a predetermined size for testing. The results are shown in Table 3.

TABLE 3

|  | Polymer composition no. | | |
|---|---|---|---|
|  | 10 | 11 | 12 |
| Ingredients (phr) | | | |
| PVC | 100 | 100 | 100 |
| EPO | 5 | 5 | 5 |
| Calcium zinc stabilizer | 0.75 | 0.75 | 0.75 |
| Stearic acid | 0.15 | 0.15 | 0.15 |
| Paraffin wax | 0.2 | 0.2 | 0.2 |
| IE2 | 46 | — | — |
| CE1 | — | 48 | — |
| CE3 | — | — | 48 |
| Properties | | | |
| Hardness[1] | 83 | 83 | 83 |
| Yellowness Index* | 2.7 | 2.9 | 2.8 |
| Tensile strength (kg/cm$^2$)** | 258 | 251 | 237 |
| Elongation (%)** | 350 | 349 | 356 |
| Migration (%)* | 7.9 | 8.6 | 14.0 |
| Brittleness temperature (° C.)* | −48 | −48 | −49 |
| Heat stability** | | | |
| Initial color (min) | 44 | 42 | 41 |
| Burnt color (min) | 100 | 90 | 80 |
| Fish eye (number of points)* | 5 | 15 | 45 |

[1]The hardness is the control parameter at value 83 ± 2.
*The lower value, the more favorable the resulting composition
**The higher value, the more favorable the resulting composition Table 3 shows that comparable hardness can be obtained with plasticizer composition comprising DOTP and 2EHP (polymer composition 10), wherein lower amounts of plasticizer is present than in polymer compositions merely comprising DOTP or DINCH as plasticizer (polymer compositions 11 and 12). The plasticizer composition comprising DOTP and 2EHP (polymer composition 10) shows less defect point, and longer time before burnt than the plasticizer compositions merely comprising DOTP or DINCH as plasticizer (polymer compositions 11 and 12).

Moreover, the plasticizer composition comprising DOTP and 2EHP (polymer composition 10) has significantly lower migration than DINCH as plasticizer (polymer composition 12).

The invention claimed is:

1. A plasticizer composition comprising a terephthalic acid di-ester and an ester having the following formula (I):

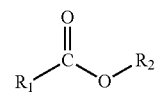

wherein R1 and R2 are the same or different and represent a straight chain or branched alkyl group.

2. The plasticizer composition according to claim 1, wherein R1 and R2 in formula (I) independently from each other have from 1 to 15 carbon atoms.

3. The plasticizer composition according to claim 1, wherein R1 has from 1 to 12 carbon atoms.

4. The plasticizer composition according to claim 1, wherein R2 has from 7 to 15 carbon atoms.

5. The plasticizer composition according to claim 1, wherein the terephthalic acid di-ester has the following formula (II):

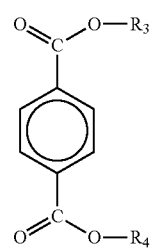

wherein R3 and R4 are the same or different and represent a straight chain or branched alkyl group having from 6 to 15 carbon atoms.

6. The plasticizer composition of claim 1, wherein the terephthalic acid di-ester is present in an amount of from 80% to 99.7% by weight with respect to the total amount of the plasticizer composition.

7. The plasticizer composition according to claim 6, wherein the terephtalic acid di-ester is present in an amount of from 85% to 99.5% by weight with respect to the total amount of the plasticizer composition.

8. The plasticizer composition of claim 1, wherein the ester of formula (I) is present in an amount of from 0.3% to 20% by weight with respect to the total amount of the plasticizer composition.

9. The plasticizer composition according to claim 8, wherein the ester of formula (I) is present in an amount of from 0.5% to 15% by weight with respect to the total amount of the plasticizer composition.

10. A method for producing a polymer composition comprising:
mixing the plasticizer composition of claim 1 with a polymer resin, wherein the polymer resin comprises at least one material selected from the group consisting of vinyl polymer, halogen-containing polymer, chlorosulfonated polyethylene, cellulose ester, acrylic polymer, and polyacetal.

11. A polymer composition comprising at least one polymer selected from the group consisting of vinyl polymer, halogen-containing polymer, chlorosulfonated polyethylene, cellulose ester, acrylic polymer, polyacetal or the mixture thereof, and a plasticizer composition according to claim 1.

12. The polymer composition of claim 11, wherein the polymer is polyvinyl chloride.

13. The polymer composition according to claim 11, wherein the plasticizer composition is present in an amount of 10 to 100 parts per 100 parts by weight of polymer.

14. The polymer composition of claim 11, further comprising at least one additive selected from the group consisting of fillers, extenders, pigments, thermal stabilizers, UV stabilizers, viscosity regulators, rheological additives, foam formers, foam stabilizers, antistatic agent, impact modifiers and lubricants.

15. The polymer composition according to claim 12, wherein the plasticizer composition is present in an amount of 10 to 100 parts per 100 parts by weight of polymer.

16. The polymer composition of claim 12, further comprising at least one additive selected from the group consisting of fillers, extenders, pigments, thermal stabilizers, UV stabilizers, viscosity regulators, rheological additives, foam formers, foam stabilizers, antistatic agent, impact modifiers and lubricants.

17. The polymer composition of claim 13, further comprising at least one additive selected from the group consisting of fillers, extenders, pigments, thermal stabilizers, UV stabilizers, viscosity regulators, rheological additives, foam formers, foam stabilizers, antistatic agent, impact modifiers and lubricants.

18. The polymer composition according to claim 11, wherein the plasticizer composition is present in an amount of 40 to 60 parts by weight of polymer.

19. The polymer composition according to claim 12, wherein the plasticizer composition is present in an amount of 40 to 60 parts by weight of polymer.

\* \* \* \* \*